United States Patent
Liu (10) Patent No.: US 7,257,095 B2
(45) Date of Patent: Aug. 14, 2007

(54) POWER SAVING VIA PHYSICAL LAYER ADDRESS FILTERING IN WLANS

(75) Inventor: Yonghe Liu, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 882 days.

(21) Appl. No.: 10/630,437

(22) Filed: Jul. 30, 2003

(65) Prior Publication Data

US 2005/0025080 A1  Feb. 3, 2005

(51) Int. Cl.
  G08C 17/00  (2006.01)
  H04B 1/16  (2006.01)
  H04B 1/38  (2006.01)
(52) U.S. Cl. ............... 370/311; 455/574; 455/343.2
(58) Field of Classification Search .......... 455/574, 455/127.5, 343.2, 343.3
  See application file for complete search history.

(56) References Cited

U.S. PATENT DOCUMENTS 6,449,694 B1 * 9/2002 Burgess et al. ............ 711/128
7,073,079 B1 * 7/2006 Karsi et al. ................ 713/320

OTHER PUBLICATIONS

"The IEEE 802.11 Standard", INRIA, Planete Team, PLANETE, IMAD AAD, IN'Tech, May 31st, 2002, 52 pgs.
"Implementation Experiences of Bandwidth Guarantee on a Wireless LAN", Srikant Sharma, Kartik Gopalan, Ningning Zhu, Gang Peng, Pradipta De and Tzi-Cker Chiueh, taken from the Internet at: www.ecsl.cs.sunysb.edu/~chiueh/cse634/wrether.pdf, date unknown, 22 pages.

"Power Saving in Wireless LANs via Schedule Information Vector", Yonghe Liu, date unknown, 4 pgs.

(Continued)

*Primary Examiner*—Rafael Perez-Gutierrez
*Assistant Examiner*—Sai-Ming Chan
(74) *Attorney, Agent, or Firm*—Steven A. Shaw; W. James Brady; Frederick J. Telecky, Jr.

(57) ABSTRACT

A system and method is described for saving power in a wireless network, using a physical layer address filtering protocol based on a partial address subset of the complete destination MAC address. The system comprises a PHY layer filtering protocol for generating the partial address and writing the partial address into a PHY layer header portion (e.g., PLCP header) of a sending station, or reading the partial address from the PHY layer header portion upon transmission of each frame. A receiving station receives and decodes these PHY layer header portion bits, in accordance with the protocol, and compares whether the subset of bits match that of the stations' own partial address. If a station finds a match, the station then continues further decoding the frame at PHY layer and send the complete frame to the MAC layer for further processing. The stations that do not have a match will not activate their MAC layer components. Thus, the stations of the network will avoid wasting power decoding a significant portion of the complete frame of other stations of the wireless local area networks and unnecessary MAC layer processing. When group addressed, control/management frames or other such frames are detected at the sending station, the address filtering protocol may be "disabled" using a partial address containing a predetermined value (e.g., all zeros).

29 Claims, 8 Drawing Sheets

OTHER PUBLICATIONS

"QoS Support on IEEE 802.11a (IEEE 802.11e)" PH. Rouzet, Jan. 26, 2002, 16 pgs.

"A Short Tutorial on Wireless LANs and IEEE 802.11", Daniel L. Lough, T. Keith Blankenship and Kevin J. Krizman, taken from the Internet at: http://www.computer.org/students/looking/summer97/ieee802.htm. date unknown, 5 pgs.

"Power-Saving Mechanisms in Emerging Standards for Wireless LANs: The MAC Level Perspective", Hagen Woesner, Jean-Pierre Ebert, Morten Schläger and Adam Wolisz, IEEE Personal Communications, Jun. 1998, pp. 40-48.

"IEEE 802.11e Wireless LAN for Quality of Service", Stefan Mangold, Sunghyun Choi, Peter May, Ole Klein, Guido Hiertz and Lothar Stibor, date unknown, 8 pgs.

"IEEE802.11 Tutorial", Jim Zyren and Al Petrick, taken from the Internet at: http://www.ydi.com/deployinfo/wp-80211-tutorial.php?screen=print, date unknown, 7 pgs.

"ANS/IEEE Std 802.11, 1999 Edition", IEEE, 1999, 17 pgs.

"Performance Analysis of the IEEE 802.11 Distributed Coordination Function", Giuseppe Bianchi, IEEE Journal on Selected Areas in Communications, vol. 18, No. 3, Mar. 2000, pp. 535-547.

\* cited by examiner

POWER SAVING VIA PHYSICAL LAYER ADDRESS FILTERING IN WLANS

FIELD OF INVENTION

The present invention relates generally to wireless networks and more particularly to systems and methods for saving power in wireless local area networks.

BACKGROUND OF THE INVENTION

The Institute of Electrical and Electronics Engineers (IEEE) has produced a series of standards referred to as 802.X, which encompasses LANs (Local Area Networks), MANs (Metropolitan Area Networks) and PANs (Personal Area Networks) such as Bluetooth. The IEEE 802 is confined to standardizing processes and procedures that take place in the bottom two layers of the OSI (Open System Interconnection) reference model—the media access control (MAC) sublayer of the link layer and the physical layer.

The original standard that is currently used to establish a wireless local area network (WLAN) is the IEEE 802.11 standard. The IEEE 802.11 standard was published first in 1997 and it was designed to provide data rates up to 2 Mbps (such as a DSL connection) at 2.4 Ghz. The standard includes specifications for Media Access Control (MAC) and physical layer operation. The physical layer standard was designed to use either frequency hopping spread spectrum (FHSS) or direct sequence spread spectrum (DSSS). In 1999, 802.11a and 802.11b provided enhancements at the physical layer with higher data rate support up to 54 Mbps in the 5 GHz band and 11 Mbps in the 2.4 GHz band, respectively.

The newly developed 802.11e standard is working to enhance the current 802.11 MAC to expand support for applications with high QoS (Quality Of Service) requirements. Wireless networks fit both business and home environments, that both require the support of multimedia, and the 802.11 e standard provides the solution for this need. In both wired and wireless networks, data transmission is susceptible to interruptions caused when packets are present or lost during the transmission process. These interruptions can cause problems for data to be streamed in a contiguous fashion. The 802.11e has created a QoS baseline document that proposes methods for handling time-sensitive traffic.

In the WLAN topology, each wireless network requires a radio transceiver and antenna. Components on the wireless network are either stations (STAs) or access points (APs). Typically, a station STA is mobile or portable, and the access point AP may be a permanent structure analogous to a base station tower used in cellular phone networks or to a hub used in a wired network. A basic service set (BSS) is formed when two or more stations have recognized each other and established a network. An extended service set (ESS) is formed when BSSs (each one comprising an AP) are connected together.

A standard WLAN according to 802.11 operates in one of two modes—ad-hoc (peer-to-peer) or infrastructure mode. The ad-hoc mode is defined as Independent BSS (IBSS), and the infrastructure mode as a BSS. WLANs may also be classified as distributed (ad-hoc), or as centralized systems (infra-structure based system).

In ad-hoc mode (IBSS), each client communicates directly with the other clients within the network on a peer-to-peer level sharing a given cell coverage area. This mode was designed such that only the clients within transmission range of each other can communicate. If a client in an ad-hoc network wishes to communicate outside of the range, one of the clients (members) must operate as a gateway and perform routing.

Figure 1:
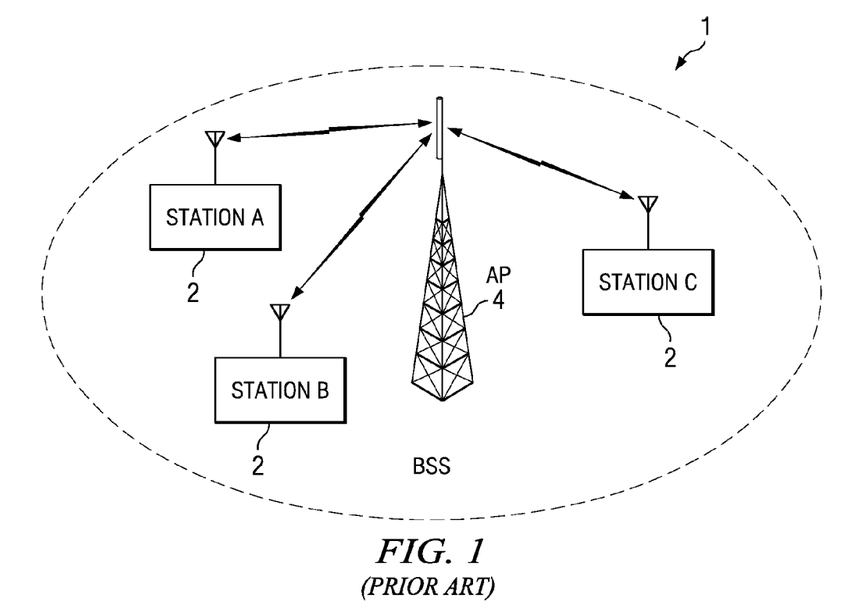
FIG. 1 is a prior art diagram illustrating a basic service set BSS of a wireless network operating in the infrastructure mode.

FIG. 1 illustrates the basic service set BSS 1 operating in the infrastructure mode, wherein a wireless network is formed between one or more stations (STA) 2 communicating with an access point (AP) 4 such as a communications tower. The access point acts as an Ethernet bridge and forwards the communications onto the network (e.g., either wired or wireless network). Several such BSS networks communicating together over the infrastructure between APs further form an Extended Service Set (ESS), or a Distribution System (DS).

Before stations and access points can exchange data, they must establish a relationship, or an association. Only if an association is established can the STA and AP exchange data. The association process involves three states:
Unauthenticated and unassociated
Authenticated and unassociated
Authenticated and associated In the transition between the states, the communicating parties exchange messages called management frames. The APs are designed to transmit a beacon management frame at fixed intervals. To associate with an access point and join the BSS, a station listens for beacon messages to identify the access points within the range. After the station receives a beacon frame (message) it selects the BSS to join. The network names, or service set identifiers (SSID) contained in the beacon frame, permit the user to choose the SSID the user wishes to join. A station can also send a probe request frame to find the associated access point with the desired SSID. After the station identifies the access point, they perform an authentication by exchanging several management frames.

Figure 2:
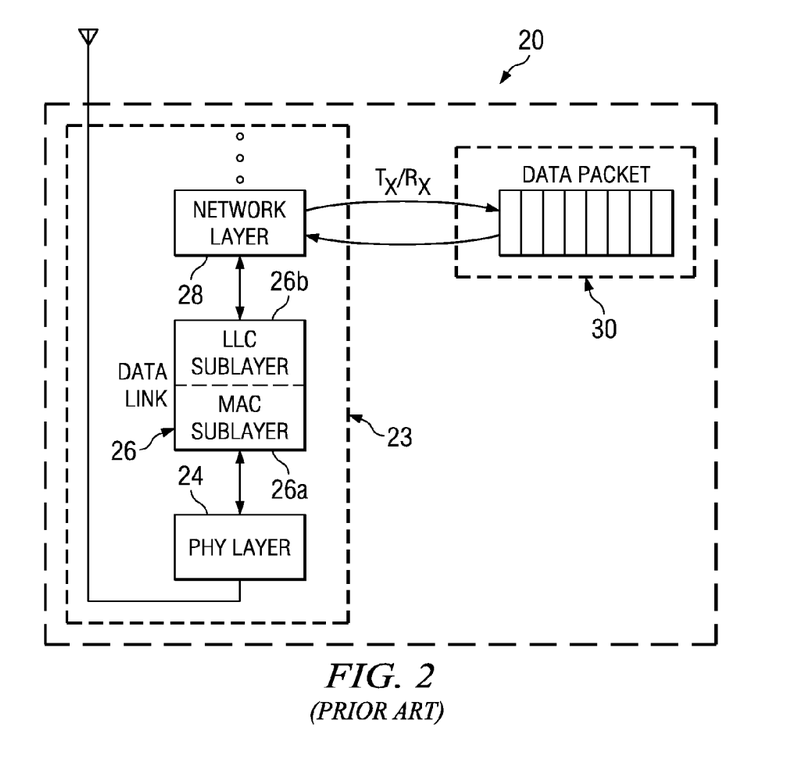
FIG. 2 is a prior art diagram of a wireless transceiver, according to the OSI reference model illustrating a series of protocol layers and a data packet to be transmitted or received.

As illustrated in prior art FIG. 2, a wireless transceiver 20, according to the OSI (Open System Interconnection) reference model, comprises in part, a series of protocol layers 23 having a physical layer PHY 24, a data link layer 26, and a NETWORK layer 28. The data link layer 26 further comprises a medium access control MAC 26a sublayer and a logical link control LLC 26b sublayer. The OSI reference model describes networking as a series of protocol layers with a specific set of functions allocated to each layer. Each layer offers specific services to higher layers while shielding these layers from the details of how the services are implemented. A well-defined interface between each pair of adjacent layers defines the services offered by the lower layer to the higher one and how those services are accessed.

The physical layer PHY 24 is involved in the reception and transmission of the unstructured raw bit stream over a physical medium. It describes the electrical/optical, mechanical, and functional interfaces to the physical medium. The PHY 24 layer carries the signals for all the higher layers. The MAC 26a sublayer of the data link layer 26, manages access to the network media, checks frame errors, and manages address recognition of received frames.

The LLC 26b sublayer establishes and terminates logical links, controls frame flow, sequences frames, acknowledges frames, and retransmits unacknowledged frames. The LLC 26b sublayer uses frame acknowledgement and retransmission to provide virtually error-free transmission over the link to the layers above. The NETWORK layer 28 controls the operation of the subnet. It determines the physical path the data should take, based on network conditions, priority of service, and other factors, including routing, traffic control, frame fragmentation and reassembly, logical-to-physical address mapping, and usage accounting.

Wireless transceiver 20 also illustrates a packet of data 30 which may be transmitted or received via the NETWORK layer 28 and other higher level layers of the transceiver 20.

Wireless Local Area Networks (WLANs) are gaining increasing popularity today by establishing anywhere and anytime connections. According to recent predictions, the market of WLAN adapters will reach 35 million units in 2005. However, a larger market for WLAN lies in the mobile device world such as cellular phones and PDAs, whose market is projected to reach 500 million units in 2005.

As more WLAN chips are embedded into battery powered mobile devices, power consumption inevitably becomes a bottleneck to its wide deployment. The average power consumption for a typical WLAN adaptor, employing the power saving technique specified in the IEEE 802.11 standard, is significantly higher than a normal cellular phone. This further implies that a cellular phone with current battery capacity will be drained in substantially less time if a WLAN chip is embedded.

Recent advancements in circuit design have reduced the power consumption of WLAN chips dramatically in sleep mode. For example, the power consumption in deep sleep state is only 2 mw in the Texas Instruments TNETW1100B series chips. However this reduction alone is not able to alleviate the problem to the same degree in current wireless LANs, as the power reduction in the deep sleep mode cannot be fully utilized.

The impeding force is the broadcast based wireless MAC protocol. To receive a frame addressed to itself, a station has to continuously monitor the wireless channel and decode every frame for the MAC address to be checked against its own. Compared with the stations transmission or reception of data, this contending procedure commonly dominates the activity of a wireless station and prevents the station from sleeping. Consequently, power consumption during contention is a major contribution to battery drain.

Recent research proposes exploiting the low power consumption available during sleep mode. Allowing a station to wake up only periodically, often at several beacon intervals, this approach requires the AP to buffer power saving traffic and deliver it according to the station's pre-negotiated listening interval.

Although such an approach reduces the power consumption significantly, it does not fully address the problem. For example, all portable devices can benefit from power savings. With the increasing amount of power saving traffic, a station waking up at a certain beacon will likely face fierce competition retrieving or receiving data from the AP, and once again, waste significant power during contention. Further, power saving traffic may be associated with additional QoS and non-QoS constraints. For example, a voice traffic stream has a stringent delay requirement, but relatively low and periodic bandwidth consumption. However, the delay requirement will preclude the station from entering sleep mode according to the protocol given above, as frequently a beacon interval is about 100 ms. In addition, the situation is exacerbated by the increasing set of QoS applications incorporating WiFi networks. Further, powering on and off different modules in WLAN devices may incur additional power consumption and delays, if power savings techniques are not carefully applied.

Accordingly, there is a need for an improved protocol to address the problems associated with QoS as well as non-QoS traffic flows and minimizing total power consumption across all the power saving stations, while ensuring scalability during increased power saving traffic on a wireless local area network.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention relates to a new system and method implemented in the physical (PHY) layer, using a PHY layer address filtering protocol based on a partial address subset of the complete destination MAC address. Such filtering saves power in wireless local area networks, as identified in the IEEE 802.11x (e.g., a, b, g, e).

The power saving system utilizing the PHY layer address filtering protocol comprises a WLAN having two or more stations, each comprising a partial address in the PHY layer for holding a portion or subset of the destination MAC address, and a PHY layer address filtering protocol for generating the partial address and writing the partial address into the PHY header (e.g., a physical layer convergence procedure (PLCP) header) upon transmission of each frame from a sending station, or reading the partial address from the PHY layer header portion (e.g., the PLCP header) of a receiving station. The receiving station receives and decodes the partial address bits at the PHY layer, in accordance with the protocol of the present invention, and compares whether the subset of bits match that of the stations' own partial address. If a station finds a match in the partial address, the station then continues further decoding the remaining part of the frame at the physical layer and passes the complete frame to the MAC layer for further address checking and processing. Thus, a number of the stations on the network will avoid wasting power decoding a significant portion of the complete frame and unnecessary MAC layer processing.

In accordance with one aspect of the invention, by doing physical address filtering, irrelevant frames can be filtered out before activating the MAC module, the high data rate path, and even from decoding all the data for many stations that are not the intended data recipient. This may provide a significant reduction of power consumption in a WLAN.

In accordance with another aspect of the present invention, when group addressed, control/management frames or other such frames which may need to be broadcast to all the stations are detected at the sending station, the address filtering protocol may be "disabled" in the receiving station using a partial address containing a predetermined value such as all zeros.

The PHY frame format (including the PLCP header) and the MAC frame format is fully detailed in the IEEE 802.11x specifications, therefore need only be summarized herein as to their utility as may be used in association with the present invention. For example, bits b4-b6 are currently reserved in the service field of the PLCP header of the IEEE 802.11b specification. These three unused bits, or any number of other such unused or newly defined bits could be utilized, in accordance with one aspect of the invention, for the partial address of a destination MAC address of a station. If these three bits, for example, mirror the last three bits of the MAC address, statistically only about one of each eight stations on the network would match the partial address and require further decoding at the MAC layer.

In another aspect of the present invention, the last several (e.g., three, four) bits of the MAC address may be exclusive OR'd (XOR) with the first several (e.g., three, four) bits to obtain an alternate subset of the MAC address for better distinction. IEEE, the administrator of IEEE MAC address space, assigns MAC address blocks with the same first 24 bits to companies. Using both the first several bits and last several bits facilitate differentiating the block address in conjunction with the individual address assignment within the block.

Still another aspect of the invention provides a method of saving power in a wireless network comprising two or more stations, a partial address for holding a portion or subset of the destination MAC address, and a PHY layer address filtering protocol for generating the partial address and writing the partial address into a PLCP header from a sending station, or reading the partial address from the PLCP header of a receiving station. The method may be accomplished in two areas of the network: a sending station area and a receiving station area.

In the sending station, the method comprises, in one aspect of the invention, generating a partial address associated with the destination MAC address, passing the partial address to the PHY layer, determining whether a normal data frame is to be transmitted, and if so, writing the partial address information into the PHY header (e.g., PLCP header) for filtering to take place. Otherwise, if specific types of frames are to be transmitted to all stations, such as group addressed or control/management frames, then "disabling" the filtering is performed by writing all zeros into the bits assigned for the partial address bits. The method may then continue in accordance with other protocols for sending and receiving data.

In the receiving stations, in another aspect of the present invention, the method comprises storing the stations own partial address in the PHY layer, receiving a transmitted frame into the PHY layer, decoding the PHY header (PLCP header) and checking the partial address bits. The receiving station then compares the received frame partial address with that of the stations' own stored address, or determines whether the partial address contains all zeros. If it is determined that the received partial address matches that of the station, or contains all zeros, the decoding continues and the complete frame is sent to the MAC for further processing, otherwise, decoding of the frame may be stopped at the PHY layer and the process does not continue into the MAC layer. The frame is therefore rejected at this point as it has been determined that the data frame is not intended for the present station, thus the MAC module or MAC high data rate for that station is not triggered, and power consumption may be significantly reduced by avoiding further decoding at the physical layer and unnecessary processing of the MAC layer.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

The present invention will now be described with reference to the attached drawings, wherein like reference numerals are used to refer to like elements throughout. The invention relates to a PHY layer address filtering protocol as a power savings mechanism in a wireless network in which a subset of the destination MAC address is represented as a partial address having several bits utilized in association with a portion of the PHY header (the PLCP header) at the PHY layer.

Current wireless LANs based on IEEE 802.11 employ a broadcast based access mechanism. In other words, a station will have to receive all the frames on the wireless channel and decode the MAC header to see if a frame is addressed to itself. Therefore, a significant amount of power may be consumed decoding irrelevant data intended for other stations. It is the intent of this invention to present a method for performing physical layer frame filtering. Such a method has the following merits on power saving.

1) It can prevent most of the irrelevant data from reaching the MAC layer and hence reduce power consumption by allowing many stations to maintain their MAC module in a sleep mode or off-state.

2) The 802.11 b/g physical layer header is transmitted at a relatively lower data rate than physical layer payload, therefore the high data rate path does not need to be activated for irrelevant data for many stations.

3) The physical layer can discontinue decoding operations in further layers immediately after decoding the physical header and hence save power.

Physical Layer Filtering

If the destination MAC address were present in the PHY header (PLCP header) at the physical layer, the physical layer could perform a complete address check and hence reject frames not addressed to the current station. However, the relatively long MAC address, usually 6 bytes, is extravagant for the limited resources available at the physical layer and would not comply with the communications standard. By contrast the design of the present invention simply uses a few bits of the MAC address at the physical layer to perform partial address filtering while still maintaining a large percentage of the power savings advantage which will be referred to herein, as "gain". These bits can be accommodated, for example, by either currently reserved bits, or by newly created bits at the PHY layer.

Setting the Partial Address

The present invention utilizes part of the MAC destination address for the purpose of partial address filtering. For example, if three bits are available, we can use the last three bits of the destination MAC address to represent the partial address. Or, for example, one can use the last three bits, and XOR these bits with the first three bits. Any portion of the MAC destination address may be employed, whether or not encoded, and any such variation is contemplated by the present invention.

The 802.11 MAC protocol employs a virtual carrier sensing mechanism to reduce collision on the shared wireless channel. This mechanism is executed at each station by setting the NAV, for which the duration field in the MAC header needs to be accessed. Because physical layer filtering may prevent the MAC from accessing the duration field of the MAC frame, this problem can be avoided by disabling the filtering protocol for certain types of frames, for example, RTS/CTS/ACK/POLL frames and other such control or management frames. Moreover, if a large number of bits are available, the Duration field may be put in the header along with the partial address, insuring that the NAV is also accommodated and set correctly. Note, data frames that are not among the RTS/CTS/ACK/POLL frames and other such control or management frames, will be termed "normal" frames herein.

Group addressed frames may also not be filtered out, as all stations may need to receive such data. For those frames that are intended to not be filtered out, all zeros (or other predetermined value) are simply written into the partial address field, which is the same as the default case.

Gain

If N bits are employed as the partial address, roughly only $\frac{1}{2^N}$ of the normal data frames need to be decoded on the wireless channel, providing that all the stations in the network employ this technique. In other words, the power for decoding roughly $(1-\frac{1}{2^N})$ of the total number of frames on the network may be saved. Notice that this gain quickly saturates as N increases, hence the first several bits of the partial address protocol concept provides the greatest benefit and thereafter becomes increasingly less useful. For example, assume a three bit partial address. Then, the portion of normal data frames that need to be decoded on the wireless channel would be: (with N=3)

$$\frac{1}{2^N}=\frac{1}{8},$$

and the portion of the power saved would be roughly:

$$(1-\frac{1}{2^N})=(1-\frac{1}{8})=\frac{7}{8}.$$

An increase in the partial address bits used from three to four bits results in the following. The portion of normal data frames that need to be decoded on the wireless channel would be: (with N=4)

$$\frac{1}{2^N}=\frac{1}{16},$$

and the portion of the power saved would be roughly:

$$(1-\frac{1}{2^N})=(1-\frac{1}{16})=\frac{15}{16}.$$

This illustrates that the gain, or the change in the power savings is about $\frac{1}{16}^{th}$ of the total power savings. It will be noted, however, as these bits only form a partial address and not a complete address, an early address determination is greatly enhanced statistically, but not fully assured until a final address match is determined in the MAC.

Sender Side Action

To use physical layer filtering, a sender (the sending STA) writes the partial address of the destination MAC address of the destination STA into, for example, the PLCP header. This partial address information may be generated at the MAC module and passed to the physical module via a writable register upon each frame transmission.

1) For normal data frames, the sender will simply write the partial address into the PLCP header.
2) For group addressed (broadcast or multicast) frames, the sender will write all zeros (or some predetermined value) for the partial address into the PLCP header.
3) For management frames (RTS, CTS, ACK, POLL, etc.), the sender will write all zeros (or some predetermined value) for the partial address into the PLCP header.

Receiver Side Action

To use physical layer filtering, a receiver (the receiving STA) needs to store its' own partial address in the physical layer. This partial address information can be generated at the MAC module and passed to the physical module via a writable register (e.g., upon system power up).

Upon reception of a frame, the physical layer of the receiver will decode, for example, the PLCP header and check to determine:

1) If the partial address in the frame matches its' own partial address, decode the frame and send it to the MAC.
2) If the partial address is all zeros, decode the frame and send it to the MAC.
3) Otherwise, stop decoding after the physical layer header and reject the frame to avoid the power consumption of decoding the frame of another station.

In order to better appreciate one or more features of the invention, the PHY and MAC address frames, several exemplary implementations of the power saving system and the associated PHY layer address filtering protocol, block diagrams for the same, and a power saving method are hereinafter illustrated and described with respect to the following figures.

Although electrical power (e.g., P, W, KW) is not synonymous with energy (e.g., WH, KWH, J, mJ), in the context of the present invention the terms "power saving", and "power consumption" have been traditionally used in documents and specifications such as the IEEE 802.11 specifications that use the terms power saving PS, and automatic power saving delivery APSD to express an electrical energy savings or energy consumption improvement. As such, these terms have also been used in the context of the present invention to reflect an electrical energy savings or energy consumption improvement, for example, in a receiving station and the power saving systems illustrated. Thus, the usage of these terms or similar "power" terms is not intended to be limiting and may be used interchangeably to express an electrical energy savings or energy consumption improvement.

Figure 3:
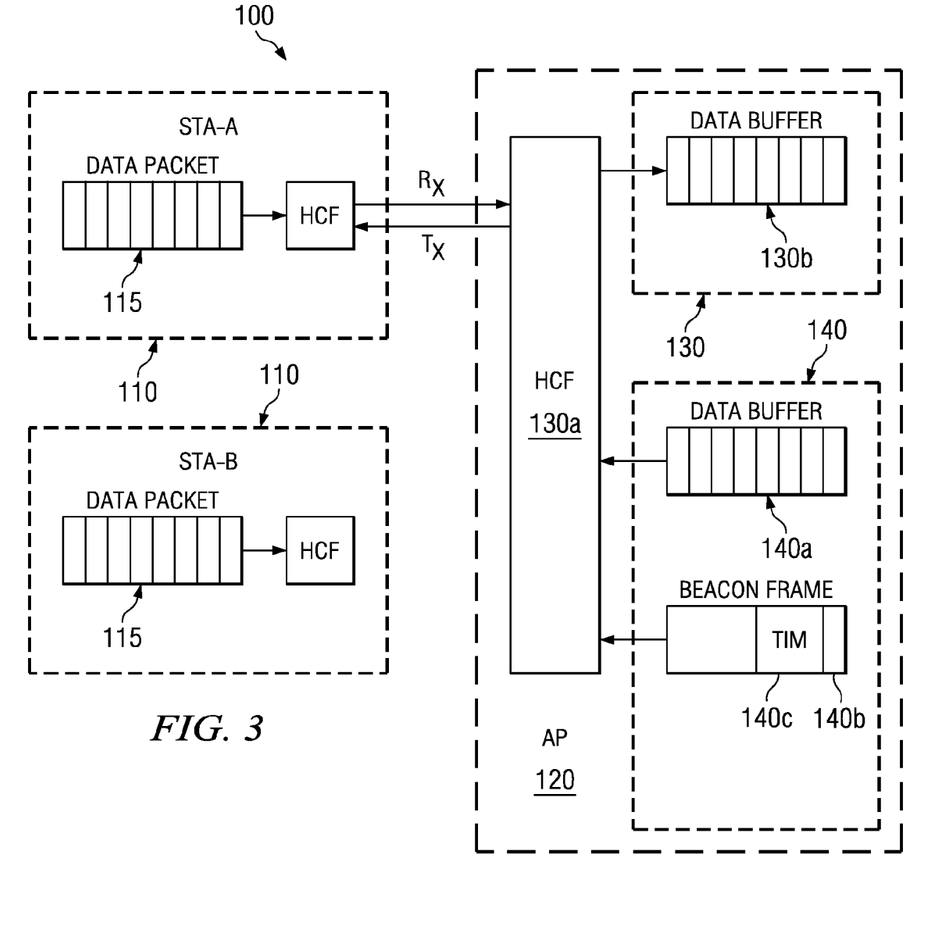
FIG. 3 is a simplified diagram of an exemplary data packet exchange between a station and an access point during an uplink or a downlink.

FIG. 3 illustrates a simplified diagram of a wireless network 100 utilizing a conventional protocol provided in association with 802.11 during a data packet exchange via an uplink or a downlink. Wireless network 100, comprises one or more stations STA-A and STA-B 110, that may either uplink a data packet 115 (e.g., of power saving data) transmitted to an access point AP 120, or receive the data packet 115 in a downlink transmission from the AP 120. The AP 120 may further comprise a transceiver having a receiver section $R_x$ 130 and a transmitter section $T_x$ 140.

Data received, for example, according to the hybrid coordination function HCF 130a, is put in data buffer 130b in the $R_x$ 130 section to be extracted and placed on the network infrastructure associated with the AP 120. Data to be transmitted, for example, from the $T_x$ 140 section is assembled in DATA BUFFER 140a and transmitted on the wireless medium according to the hybrid coordination function. However, STA-A and STA-B must first decode the entire length of all frames entering through the PHY and MAC layers before deciding if the data was intended for the receiving station, and whether power has been wasted on decoding and processing irrelevant data.

By contrast, the inventors of the present invention have realized that a minimal amount of address filtering at the PHY layer may save a significant portion of the power consumption of decoding irrelevant data at the physical layer, and also save the power consumption of further processing of frames at the MAC module.

Additionally, the inventor herein has realized that by performing address filtering "up front" at the PHY layer, irrelevant frames can be filtered out before activating the MAC module, the MAC module high data rate path, and even before decoding all the data. Thus power consumption may be significantly reduced in some instances in WLANs.

Physical layer address filtering in accordance with the protocol of the present invention will be shown to provide a clean separation between the PHY layer and the MAC module. In addition, the inventor has further realized that PHY layer address filtering may be easy to implement without the need of additional modules.

The invention is facilitated by storing several unused bits into, for example, the physical layer convergence procedure PLCP header, supplied as a subset of the destination MAC address for a destination STA. This subset of the destination MAC address, stored as several bits in the PLCP header, will be defined herein as a "partial address", since the data stored therein represents a portion of the complete destination MAC address. By decoding only these few bits in the partial address, for example, a receiving STA can quickly and easily filter out whether a data frame matches that of its' own partial address or that of another STA. Only if a match is present (or if the partial address is a predetermined value such as all zeros) will the data frame be presented for additional decoding at the physical layer and further processing to the MAC module (e.g., a final address match). Thus, the partial address and the PHY layer address filtering protocol of the present invention provides early filtering at the PHY layer to avoid a significant portion of the power consumption of decoding irrelevant frames of other stations.

Although the protocol utilized in the present invention is discussed in conjunction with the above standards, it should be understood that incorporation may occur in other protocols and such alternatives are contemplated as falling within the scope of the present invention.

Figure 4:
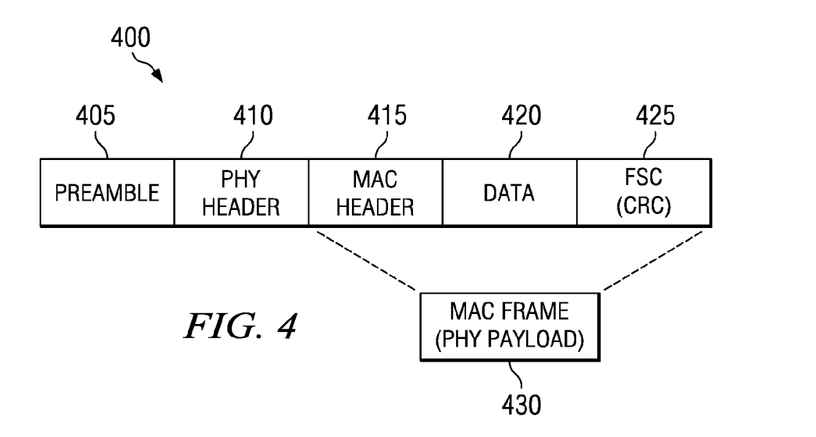
FIG. 4 is a diagram illustrating an exemplary basic PHY frame format and exemplary fields used according to IEEE 802.11b including the fields which comprise the MAC Frame or PHY payload area.
Figure 5:
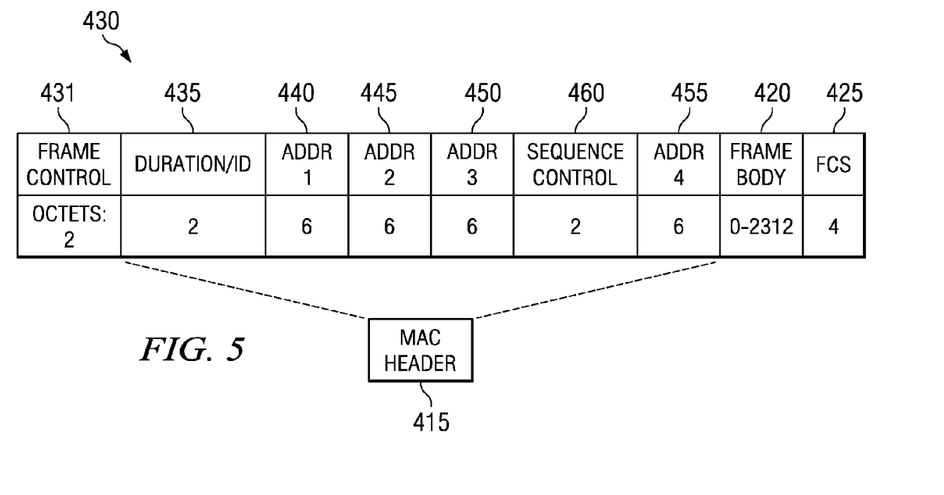
FIG. 5 is a diagram illustrating an exemplary MAC frame format and exemplary fields used according to IEEE 802.11b including the fields which comprise the MAC header area.

FIGS. 4 and 5 illustrate exemplary formats of a basic frame and MAC Frames and the fields used according to IEEE 802.11 including the fields that comprise the MAC Frame and the MAC header.

FIG. 4 illustrates a basic frame format 400 comprising a PREAMBLE 405, a PHY header 410, a MAC header 415, a DATA field 420, and an FSC field 425 used for cyclic redundancy checks (CRC). The DATA field 420 is the MAC payload. The MAC Header 415, the DATA field 420, and the FSC (CRC) field 425 collectively comprise the MAC Frame 430, which is also known as the PHY Payload.

FIG. 5 further illustrates a format of the MAC frame 430 in accordance with 802.11. A field name identifies the specific field within the frame of FIG. 5 together with a corresponding number of octets used within each field as shown. The MAC header 415 has a Duration ID field 435 having two octets, as discussed previously with respect to the virtual carrier sensing mechanism and the setting of the NAV. The MAC header 425 further comprises several Address fields 440, 445, 450, and 455 comprising six octets each, and a Sequence Control field 460 having two octets. Address 1 field 440 represents the destination MAC address of the frame.

Figure 6:
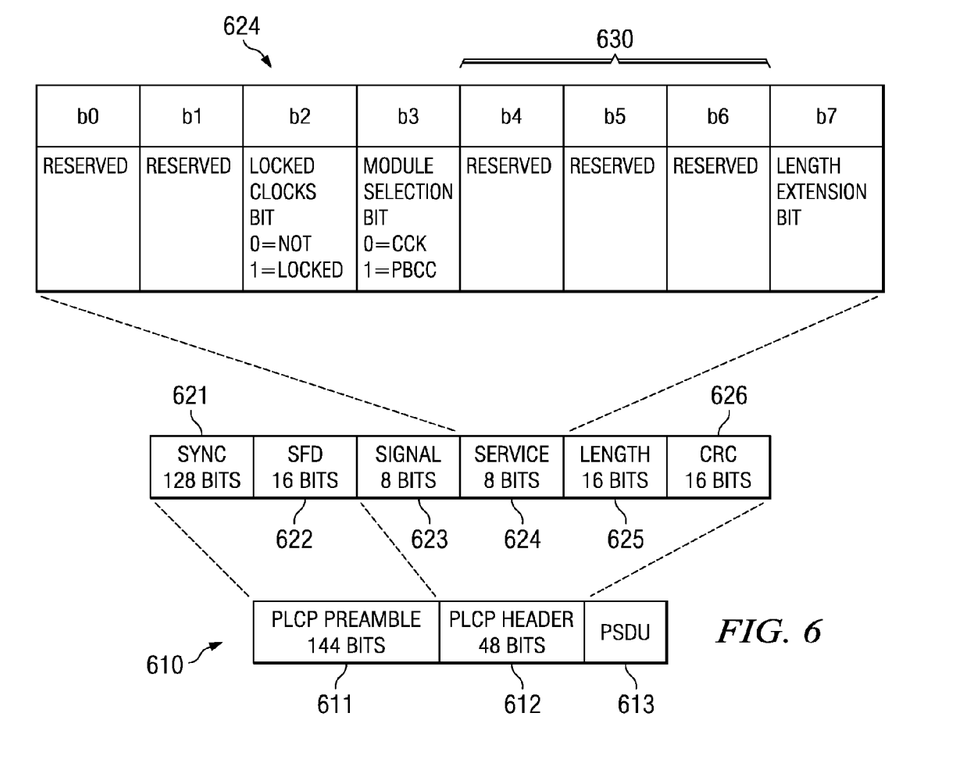
FIG. 6 is a diagram illustrating an exemplary PHY frame format according to 802.11b further illustrating the fields of the PLCP header, the service field, and several reserved bits that may be utilized for the partial address bits in association with the protocol of the present invention.

FIG. 6 illustrates a format of a PHY frame 610 according to 802.11b used in accordance with the PHY layer protocol of the present invention. The PHY frame 610 comprises a PLCP Preamble field 611 of 144 bits, a PLCP Header field 612 of 48 bits, and a PSDU field 613. The PLCP header 612 further comprises a Signal field 623, a Service field 624, a Length field 625 and the CRC field 626. Finally, the Service field 624 comprises an eight bit field (e.g., b0-7), having five reserved bits (e.g., b0, b1, and b4-6) that may be utilized in one example for the partial address bits (e.g., bits b4-6) in association with the PHY layer address filtering protocol of the present invention.

For example, three bits b4-6 of the service field 624, may be used as a three bit partial address 630 to represent the last three bits of a destination MAC address contained in address field 440 in the MAC header 415 of FIG. 5. While the three bits of the partial address 630 is only a small fraction of the 48 bits of the complete destination MAC address, the three bits help eliminate having to decode approximately $1-\frac{1}{8}=\frac{7}{8}$ of the irrelevant MAC addresses and data at the physical layer and MAC module to save about ⅞ of the decoding and processing power consumption. Further, although a three bit partial address 630 is illustrated and described herein, any number of bits (e.g., N-bits) comprising a subset of the complete destination MAC address (excluding the complete MAC address) may be used in the partial address, and is anticipated in the present invention.

Figure 7:
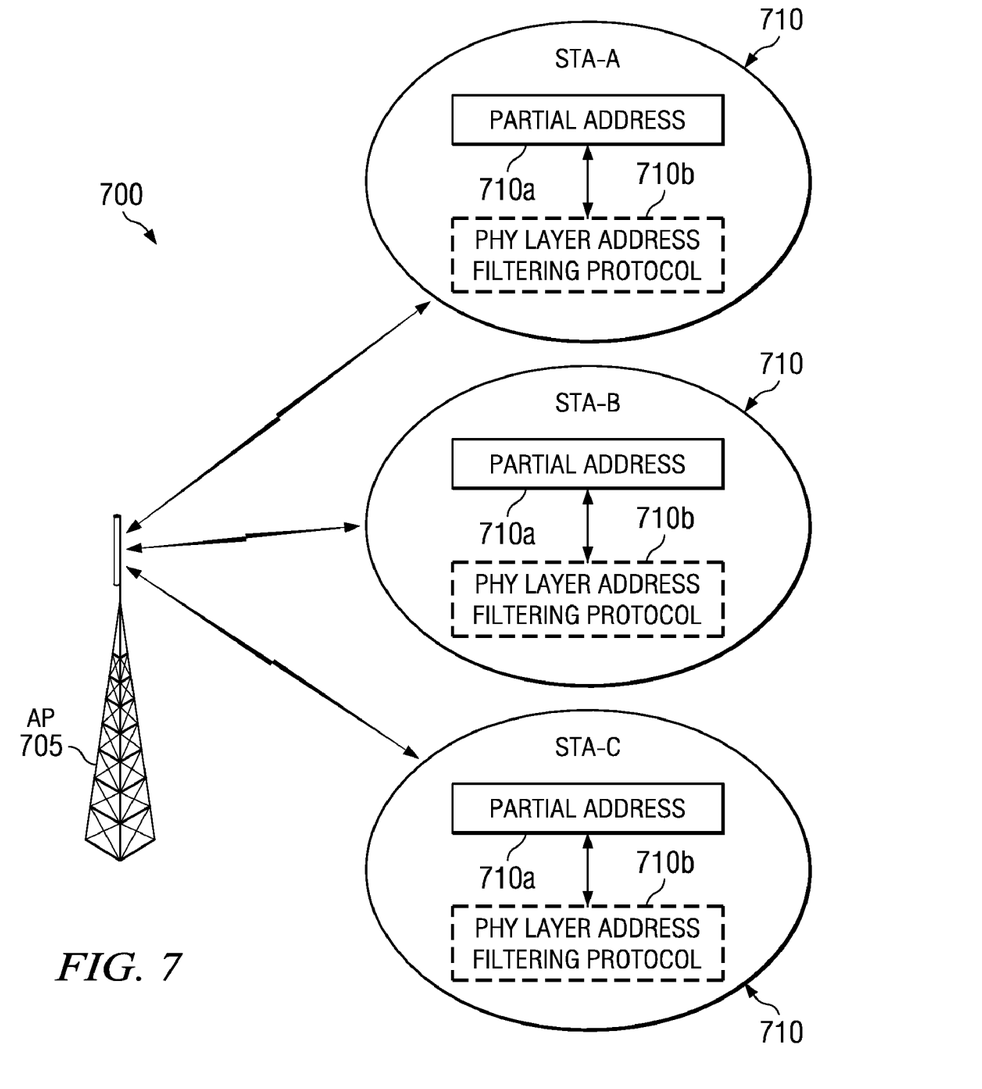
FIG. 7 is a simplified block diagram of an exemplary WLAN power savings system operating in the infrastructure mode, utilizing a partial address and PHY layer address filtering protocol in accordance with various aspects of the present invention.

FIG. 7 illustrates a simplified block diagram of an exemplary WLAN power saving system 700 operating in the infrastructure mode. Although the power saving system 700 of FIG. 7 is illustrated as a basic service set BSS, in the infrastructure mode using an AP 705, the system and protocol of the present invention is equally applicable to the independent BSS (IBSS) not using an AP, and the use of other such networks and systems is anticipated within the context of the present invention.

The power saving system 700 comprises two or more stations 710 (e.g., STA-A, B, C), each station having a partial address 710a and PHY layer address filtering protocol 710b. The partial address 710a holds a portion or subset of the destination MAC address, while the PHY layer address filtering protocol 710b is used to generate the partial address and write the partial address into the PLCP header 710b (e.g., b4-6 of the Service field 624 of the PLCP header 612 of FIG. 6) upon transmission of each frame from a sending station, or reading the partial address 710a from the PLCP header of a receiving station. In the power saving system 700 of FIG. 7, one of the two or more stations 710 will be a sending station and another of the two or more stations will be an intended destination or receiving station. The receiving station receives and decodes the partial address bits at the PHY layer, in accordance with the protocol of the present invention, and compares whether the bits match those of the stations' own partial address. Only if a station finds a match in the partial address (or reads a predetermined value such as all zeros) will the station then continue further decoding the complete MAC address in the MAC layer. Thus, the stations of the network not having a match will avoid wasting power decoding a significant portion of the complete MAC address of other stations on the wireless local area network.

Figure 8:
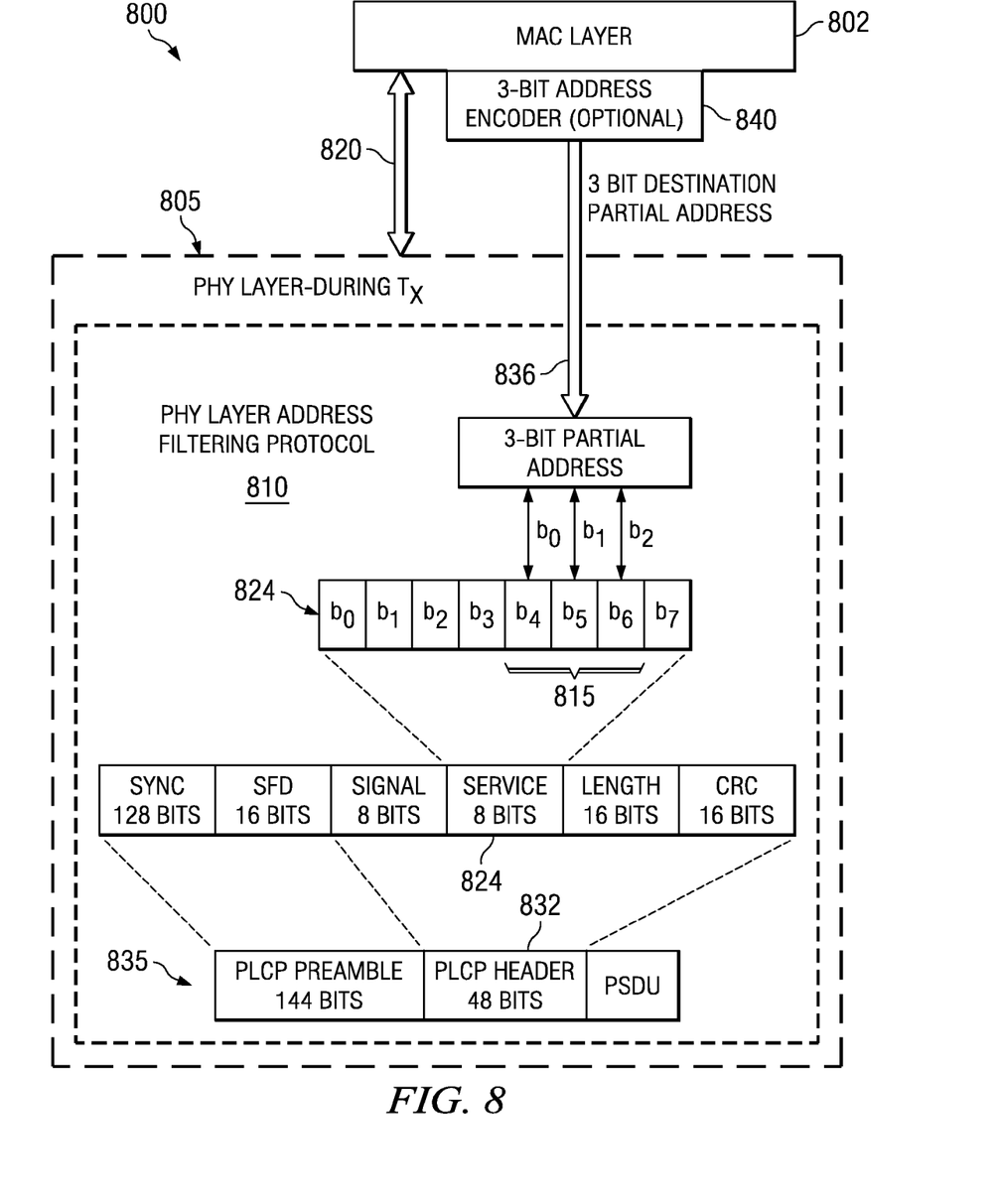
FIGS. 8-9 are simplified functional block diagrams of a station utilizing the exemplary PHY layer address filtering protocol and the partial address of the power saving WLAN system of FIG. 7 illustrating an exemplary sending and receiving station, respectively.
Figure 9:
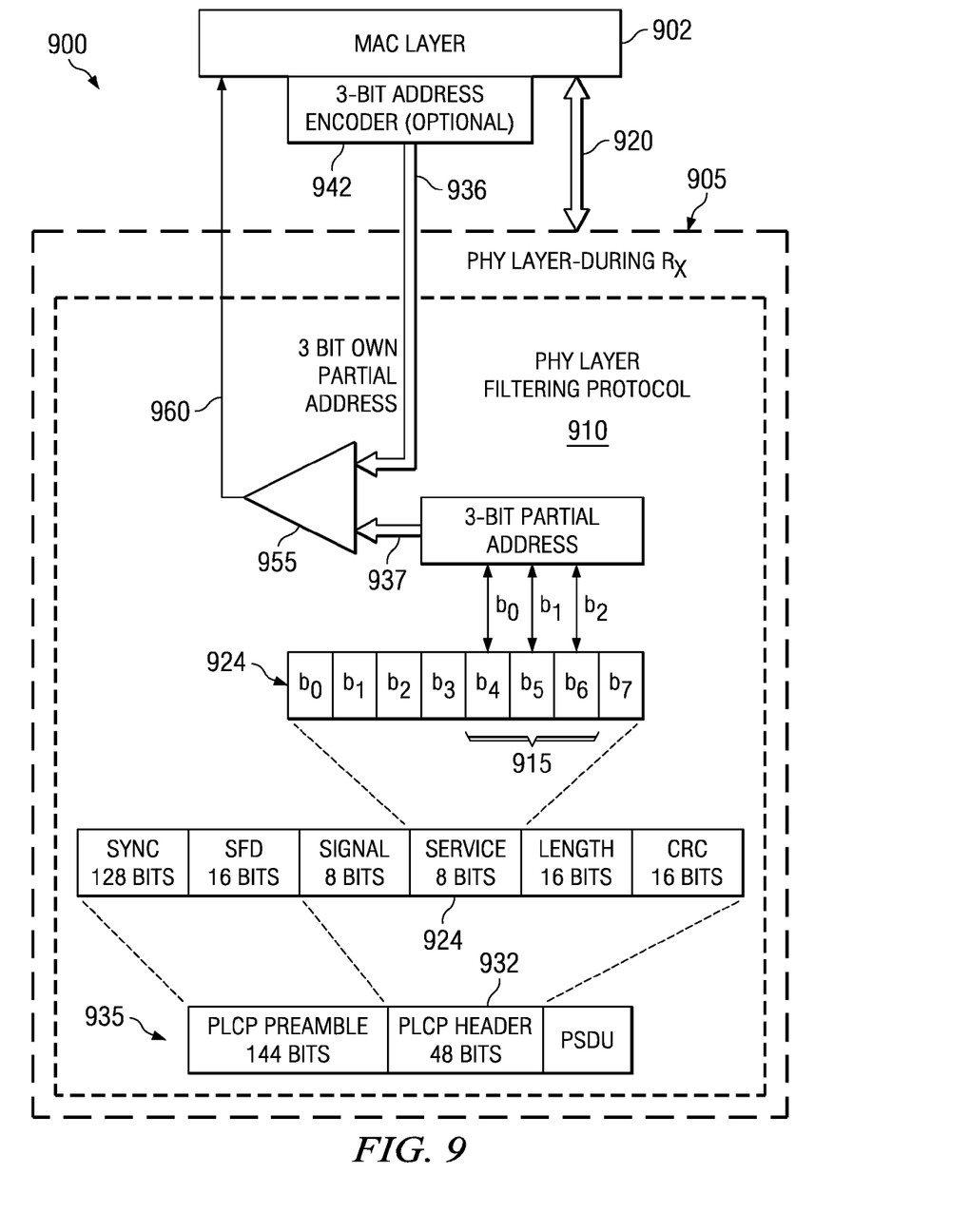

FIGS. 8-9, for example, illustrate an exemplary sending station 800 and a receiving station 900, respectively, utilizing the partial address 710a and the exemplary PHY layer address filtering protocol 710b of the power saving WLAN system 700 of FIG. 7 in accordance with the present invention.

For example, the sending STA 800 of FIG. 8, and the receiving STA of FIG. 9, respectively, both comprise a MAC layer 802 and 902, and a PHY layer 805 and 905 having a PHY layer address filtering protocol 810 and 910, respectively. In the example, both sending and receiving stations further comprise a 3-bit partial address 815 and 915 as a subset of the complete MAC address 820 and 920 for writing into or reading from the bits (e.g., b4-6) of the service field 824 and 924 of the PLCP Header 832 and 932 of the PHY frame 835 and 935 in the PHY layer 805 and 905, respectively.

During $T_x$ from the sending station 800, for example, the MAC 802 writes a 3-bit destination partial address 836 into the PLCP header 832 in the PHY layer 805. The 3-bit partial address 815, 836 comprising the unused bits b4-6 of the Service field 824 receive the 3-bit destination partial address according to the PHY layer address filtering protocol 810. Alternately, the 3-bit destination partial address 815 may be encoded to provide an encoded 3-bit partial address 836 using an optional address encoder 840. For example, the encoder 840 may XOR the first three bits with the last three bits of the destination MAC address 820 or provide other types of encoding for some situations in accordance with an aspect of the invention.

Otherwise, as stated above, the 3-bit partial address 815 may be written directly into three unused or otherwise designated bits of the PLCP header 832, to represent a subset of the complete MAC address 820 which may be filtered, or otherwise checked at the PHY layer 805. In addition, if a group addressed, or a control or management frame is to be transmitted, all zeros (a default condition) or some other predetermined value are written into the partial address to indicate to the receiving stations that decoding should continue in the MAC modules.

During $R_x$ at the receiving station 900, for example, upon power-up the MAC 902 of the receiving station 900 writes into a PHY layer 905, its own 3-bit partial address 936, for example, into a register. Upon receiving a normal data frame within the PHY frame 935, a 3-bit partial address 915 may be received from bits b4-6 of the Service field 924 of the PLCP header 932 utilizing the PHY layer address filtering protocol 910. The 3-bit partial address 915 is then compared to the stations' own 3-bit partial address 936 using a comparator 955, for example. The comparison result 960 may be used to control whether further decoding of the remaining data in the frame or triggering of the MAC module should continue based on the result that the received address bits 915 match that of the stations' own partial address 936. In addition, if a default condition of all zeros in the partial address is detected, indicating a group addressed or a control or management frame has been received, further decoding and processing continues in the physical layer and MAC module.

Alternately, if the received 3-bit partial address 915 is encoded, the station's own 3-bit partial address 936 should be generated using an optional address encoder 942 following the same encoding rules, for example, in the encoder 840 in FIG. 8.

Therefore, the present invention provides a wireless network power savings system in a PHY layer address filtering protocol that minimizes the overall receiver address decoding power consumption.

Figure 10:
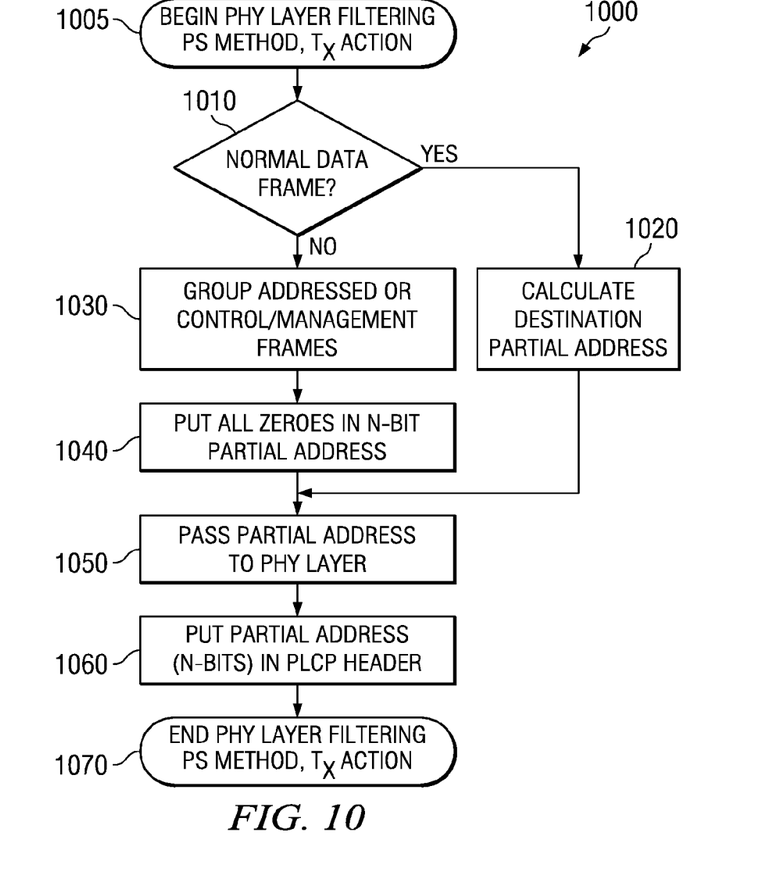
FIGS. 10-11 are flow charts illustrating a method of saving power in an exemplary sending and receiving station, respectively, of a wireless network using the PHY layer address filtering protocol in accordance with the power saving system of FIG. 7, and various aspects of the present invention.
Figure 11:
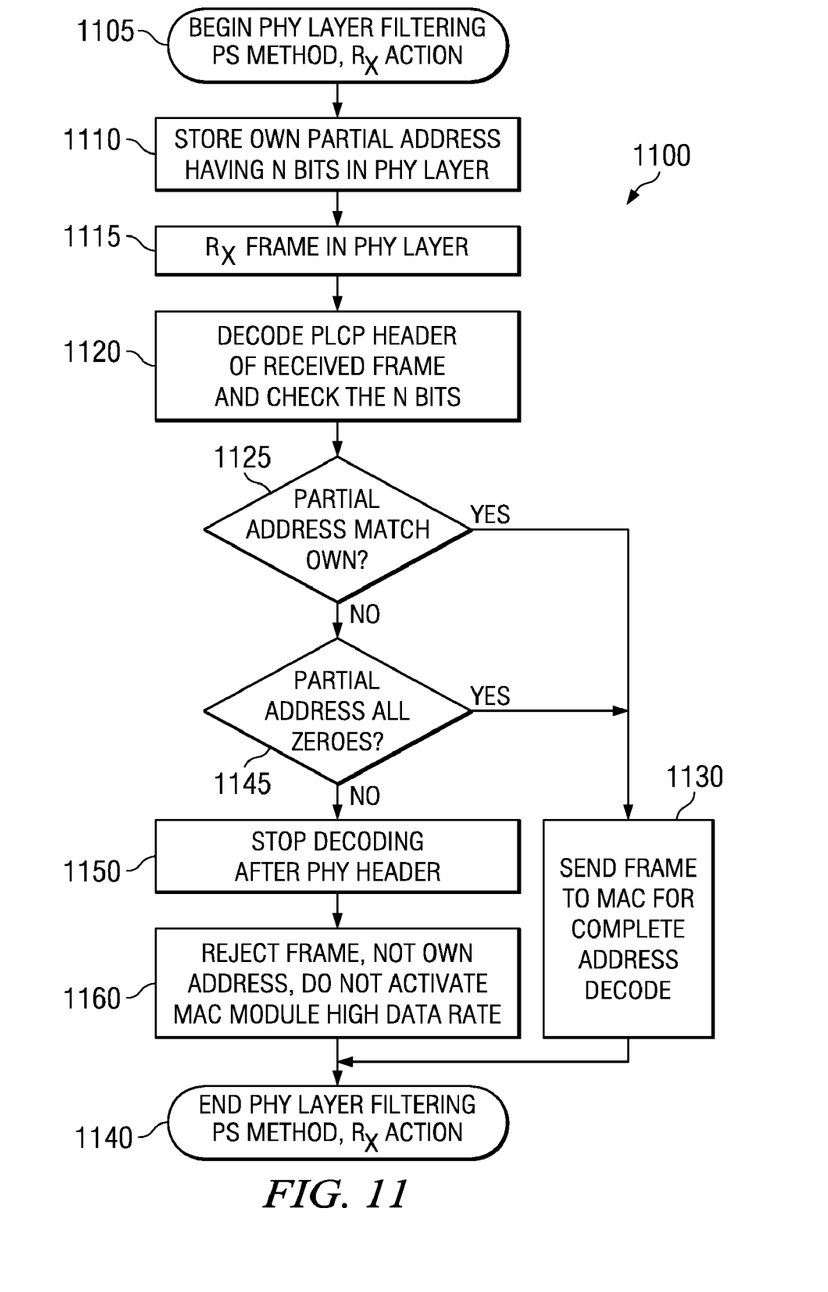

FIGS. 10-11 are flow charts illustrating a method of saving power in an exemplary sending and receiving station, respectively of a wireless network using a PHY layer address filtering protocol in accordance with the power saving system of FIG. 7, the sending and receiving stations of FIGS. 8-9, respectively, and various aspects of the present invention.

Referring now to FIG. 10, an exemplary method 1000 is illustrated for saving power in a wireless network 700 comprising two or more stations 710, each having a partial address 710a, 815 and a PHY layer address filtering protocol 710b, 810 as may be employed in the transmission of a frame 835 at a sending station 800.

While the method 1000 and other methods herein are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the method 1000 according to the present invention may be implemented in association with the network elements, protocols and formats illustrated and described herein as well as in association with other elements, protocols and formats not illustrated.

The exemplary power saving method 1000 of FIG. 10, in accordance with the wireless network 700 of FIG. 7 and sending station 800 of FIG. 8, begins at 1005. Initially, at 1010, the frame 835 to be transmitted is checked at the MAC layer 802 to determine whether a normal data frame is to be transmitted, using the filtering protocol 710b, 810. If at 1010 a normal frame is identified for transmission, then the partial address 710a, 815 is calculated (or otherwise generated) at 1020, as a subset of a destination MAC address 820 for a destination station 710. If, however, it is determined at 1010 that a group addressed, or a control/management frame is to be transmitted as identified at 1030, then a predetermined value (e.g., all zeros) is written into the partial address field 815 of the PLCP header 832 at 1040 to effectively "disable" the filtering protocol 710b, 810 at the receiving stations 710.

Method 1000 then passes the partial address 710a, 815 containing the destination partial address or the partial address with the predetermined value (e.g., all zeroes), to the PHY layer 805 at 1050. The data within the partial address 710a, 815 (e.g. comprising three bits, or N-bits), is written into the PHY header (e.g., PLCP header 832) at 1060. Thereafter, the power savings method 1000 of the present invention ends at 1070, and the transmission of the frame 832 continues as usual in association with the standard protocols of 802.11 for a wireless network 700. Thus, the present invention provides a protocol that minimizes the overall receiving power consumptions for a wireless network for a subsequent transmission/receipt of the above packet.

Referring now to FIG. 11, an exemplary method 1100 is illustrated for saving power in a wireless network 700 comprising two or more stations 710, each having a partial address 710a, 915 and a PHY layer address filtering protocol 710b, 910 as may be employed in the reception of a frame 935 at a receiving station 900.

The exemplary power saving method 1100 of FIG. 11, in accordance with the wireless network 700 of FIG. 7 and receiving station 900 of FIG. 9, begins at 1105. Initially, at 1110, for example upon power-up, the receiving station 900 stores or otherwise passes its' own partial address 936 (e.g., 3-bits, or N-bits) to the PHY layer 905 in accordance with the address filtering protocol 710b, 910 of the present invention. At 1115 a frame 935 is received at the PHY layer 905, and the bits (e.g., 3-bits, or N-bits) of the partial address 710a, 915 of the PLCP header 932 are checked and optionally decoded 937 at 1120 as previously indicated in association with the optional address decoder 942.

The received partial address 710a, 915 or the optionally decoded address 937 is then compared 955 at 1125 to the stations' own partial address 936 for a match. If at 1125 an address match is detected 960, indicating the frame has a higher likelihood that it is addressed to the receiving station 900, or if at 1145 all zeros are detected 960 indicating that the current frame is a group addressed or control/management frame, then the entire frame 935 is passed to the MAC 902 at 1130 for the complete MAC destination address 920 to be decoded.

Otherwise, if it is determined that the frame received is not addressed to the receiving station at 1125, and that all zeros are not present at 1145, the decoding of the frame stops at 1150 at the PHY layer 905 after the partial address 710a, 915 in the PLCP header 932 has been checked 955. Then at 1160, in accordance with the PHY layer address filtering protocol 710b, 910, after the decoding has been stopped, the frame is rejected by the receiving station and the MAC module high data rate path is disabled. Thereafter, the power savings method 1100 of the present invention ends at 1140 for a wireless network.

Thus, the present invention avoids the power consumed in decoding the extensive MAC address for a significant portion of the stations at the MAC layer by filtering out the bulk of the irrelevant station addresses at the PHY layer. A few bits of the destination MAC address comprise a partial address that may be stored in a few unused bits of the service field of the PLCP header, and decoded at the PHY layer. Therefore, a wireless network power savings system is provided in the present invention utilizing a PHY layer address filtering protocol that minimizes the overall receiver power consumed decoding irrelevant station addresses.

Figure 12:
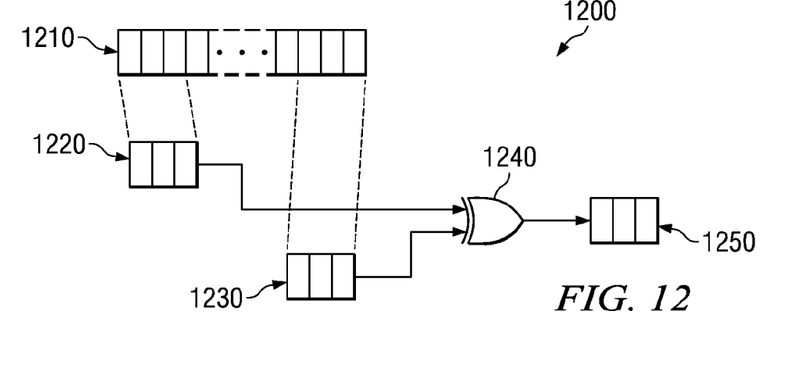
FIG. 12 is a diagram illustrating an exemplary encoding of the partial address by exclusive XOR-ing a vendor ID number and the partial address as used in the PHY layer address filtering protocol in accordance with an aspect of the present invention.

FIG. 12 illustrates a diagram of an exemplary encoder 1200 similar to the encoder 840 used in the sending station 800 of FIG. 8. Encoder 1200, for example, may extract the first several bits of the MAC address 1210 often used as part of the Vendor ID number 1220. The last several bits of the MAC address 1210, in accordance with the present invention, may be the subset of the complete MAC address representing a Partial Address 1230. The encoding operation, for example, may XOR 1240 the partial vendor ID number 1220 and the partial address 1230, to form an encoded partial address 1250 for certain situations in accordance with an aspect of the present invention. Although an XOR logic device has been illustrated and described herein, any other means or method of encoding the partial address with a partial vendor ID number, user defined data, or any other such data is also anticipated in the context of the present invention.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A system for saving power in a wireless network having two or more stations, at least some of the stations associated with the wireless network comprising:
   a partial address associated with a subset of the destination MAC address of a receiving station in the wireless network; and
   a PHY layer filtering protocol configured to generate and write the partial address into a PHY layer header portion of a frame of a sending station in the wireless network, or configured to read the partial address from the PHY layer header portion of a frame of the receiving station upon receipt of a data frame,
   wherein a plurality of receiving stations having the PHY layer filtering protocol associated with the wireless network determine at the PHY layer whether the partial address received in the PHY layer header portion of a received frame matches an internal partial address, and
   wherein the plurality of receiving stations reject the received frame if no match is found or the partial address in the received frame is a predetermined value.

2. The system of claim 1, wherein the generation of the partial address is done in the MAC layer and passed to the PHY layer.

3. The system of claim 2, further comprising a writable register for passing the generated partial address from the MAC layer to the PHY layer.

4. The system of claim 3, wherein upon power-up of a receiving station, the internal partial address is passed from the MAC layer to the PHY layer.

5. The system of claim 4, wherein the internal partial address of a receiving station is a subset of the stations' own MAC address.

6. The system of claim 1, wherein the PHY layer filtering protocol is further operable to write a predetermined value into the partial address PHY layer header portion to indicate one of a group addressed frames, a control frame, and a management frame for disabling the PHY layer filtering in a receiving station.

7. The system of claim 6, wherein the predetermined value written into the partial address contains all zeros.

8. The system of claim 6, wherein a receiving station is further operable to determine from the predetermined value in the partial address whether one of a group addressed frames, a control frame, and a management frame is indicated for disabling the PHY layer filtering for these type frames in a receiving station, or whether a partial address match is present, thereby indicating that further decoding of the complete destination MAC address is required.

9. The system of claim 1, wherein each receiving station is further operable to read a partial address from the PHY layer header portion upon reception of each frame using the PHY layer filtering protocol.

10. The system of claim 1, wherein the PHY layer filtering protocol is further operable to write the partial address into the PHY layer header portion of a sending station upon transmission of a normal data frame.

11. The system of claim 1, wherein the partial address is written into newly defined bits in the PHY layer header portion.

12. The system of claim 1, wherein the partial address is written into currently reserved bits in the service field of the PLCP header.

13. The system of claim 1, wherein the partial address is written into newly defined bits in the PHY layer header portion.

14. The system of claim 1, wherein the partial address is written into newly defined bits in the PLCP header.

15. The system of claim 1, wherein the partial address in the PHY layer header portion comprises a subset of the destination MAC address having two or more bits.

16. The system of claim 1, wherein the PHY layer filtering protocol is further operable to generate the partial address as a combination of all or part of the vendor identification bits and a subset of the destination MAC address bits.

17. The system of claim 1, wherein the generation of the partial address comprises selecting a subset of the destination MAC address bits and writing the information from the bits into the PHY layer header portion.

18. A method of saving power in a wireless network, comprising:
generating a partial address associated with a subset of a destination MAC address of a receiving station in the wireless network;
writing the partial address in a PHY layer header portion of a data frame; and
sending the data frame to a plurality of stations associated with the wireless network.

19. The method of claim 18, further comprising:
receiving the data frame at each of the plurality of stations associated with the wireless network;
comparing the partial address in the PHY layer header portion of the data frame to a partial address associated with each of the plurality of stations at the PHY layer thereof; and
activating a MAC layer component within one or more the plurality of stations if the partial address in the PHY layer header portion of the data frame matches the partial address in the one or more of the plurality of stations, respectively.

20. The method of claim 18, further comprising:
determining whether a data frame to be transmitted comprises a group addressed or control/management frame; and
writing a predetermined value for the partial address into the PHY layer header portion of the data frame if the data frame is determined to be a group addressed or control/management frame.

21. The method of claim 18, wherein the generating of the partial address is done in the MAC layer of a station in the wireless network.

22. The method of claim 18, wherein the partial address is passed from the MAC layer to the PHY layer of a station in the wireless network.

23. The method of claim 18, wherein the generation of the partial address comprises selecting a subset of bits of the destination MAC address and writing the subset of bits into the PHY layer header portion of the data frame to be transmitted.

24. A method of saving power in a wireless network, comprising:
storing a partial address in a PHY layer of a station, the partial address associated with a subset of the stations' own MAC address;
receiving a data frame in the PHY layer, the data frame containing a partial address in a PHY layer header portion thereof;
determining whether the partial address of the received data frame matches the partial address stored in the PHY layer of the station; and
rejecting the data frame if the partial addresses do not match.

25. The method of claim 24, wherein rejecting the data frame further comprises preventing activation of a MAC layer portion of the station, thereby preventing power consumption associated therewith.

26. The method of claim 24, further comprising:
sending the received data frame to a MAC layer of the station for further address decoding if the partial address matches that of the station.

27. The method of claim 24, further comprising:
determining whether the partial address of the received data frame comprises a predetermined value; and
sending the received data frame to the MAC layer of the station for further address decoding of the partial address comprises the predetermined value.

28. The method of claim 24, wherein storing a receiving stations' own partial address in the PHY layer comprises writing the partial address from a register in the MAC layer of the receiving station to the PHY layer of the receiving station upon power-up.

29. The method of claim 24, wherein determining whether the partial addresses match comprises decoding the partial address data in the PHY layer header portion of the received frame prior to a comparison of the partial addresses.

* * * * *